UNITED STATES PATENT OFFICE.

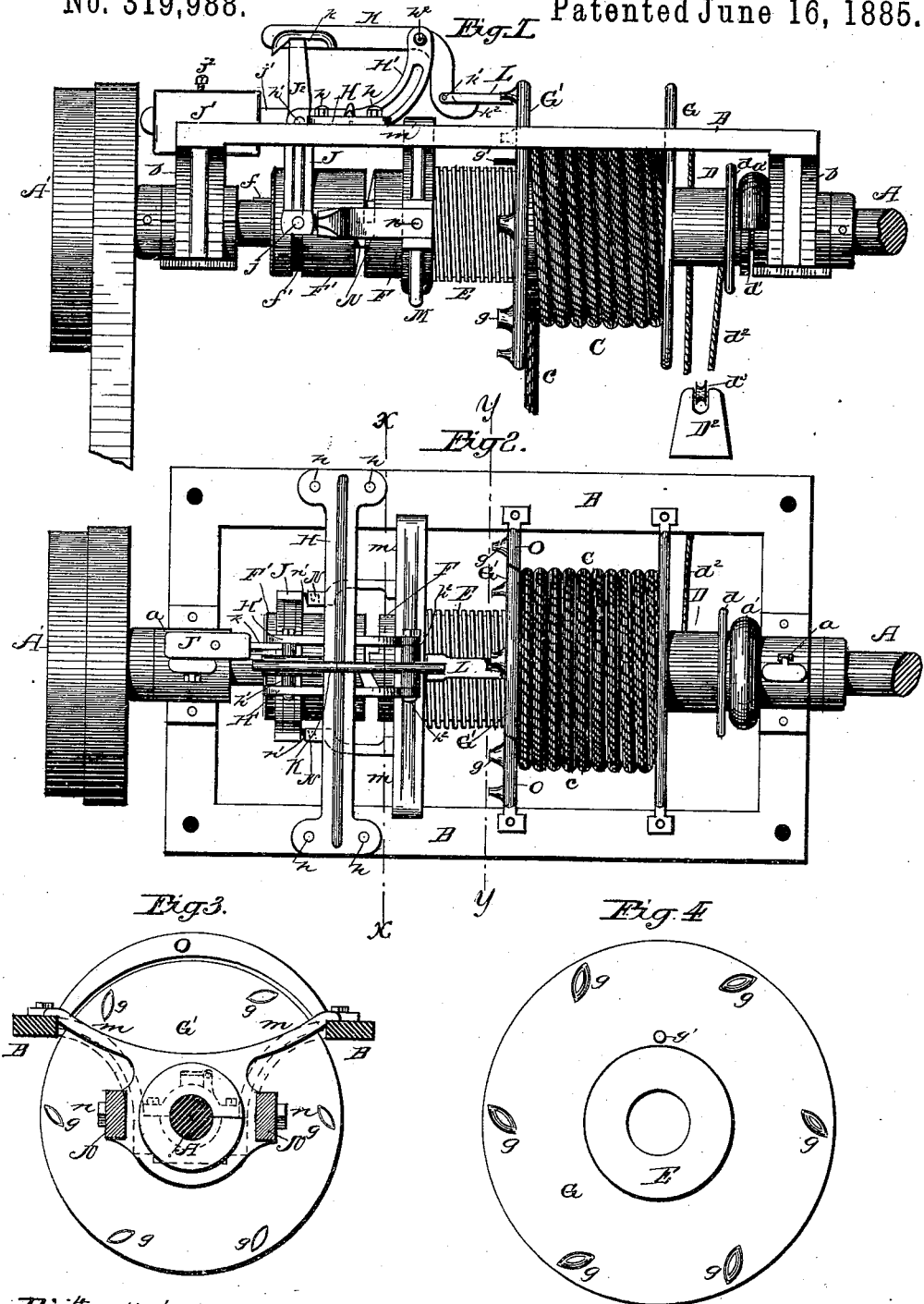

JOHN S. METCALF, OF BURLINGTON, IOWA.

GRAIN-SHOVELING MECHANISM.

SPECIFICATION forming part of Letters Patent No. 319,988, dated June 16, 1885.

Application filed February 25, 1885. (No model.)

*To all whom it may concern:*

Be it known that I, JOHN S. METCALF, of Burlington, Iowa, late of Indianapolis, Indiana, have invented certain new and useful Improvements in Grain-Shoveling Mechanism, of which the following is a description, reference being had to the accompanying drawings, in which—

Figure 1 is a front elevation. Fig. 2 is a plan view. Fig. 3 is a transverse vertical sectional view on the line $xx$, Fig. 2, as viewed in the direction of the arrow there shown; and Fig. 4 is a like sectional view on the line $yy$, Fig. 2.

Like letters of reference indicate like parts in the different figures.

The object of my invention is to provide a grain-shoveling device which may be especially adapted for use in the unloading of grain-cars, may be simple and cheap in its construction, and automatic in its operation, all of which will be hereinafter more particularly described, and definitely pointed out in the claims.

In the drawings, A represents a shaft mounted in suitable bearings, $a\ a$, secured to hangers $b\ b$, Fig. 1, which depend from and form a part of a frame, B, said shaft being thus lowered beneath the main frame to permit a more ready manipulation of the rope attached to the spool therein, as hereinafter described. Said shaft is actuated by a pulley, A′, in the usual manner.

Upon the shaft A is loosely secured a spool, C, having upon one end a smaller spool, D, and upon the opposite end a hub, E, with a screw-thread cut thereon, which hub is provided with an extension, F, forming one member of a clutch, the opposite member or counterpart F′ of which is feathered to said shaft by means of a key, $f$, Fig. 1, by which said member is caused to revolve with the shaft, but is permitted to have a longitudinal movement thereon. The spools C D, screw-hub E, and clutch member F are of iron, and preferably cast in one piece. The spool C is provided with flanges G G′ upon its ends, respectively, which serve as guards to retain a rope, $c$, in position while being wound and unwound from said spool, one end of which said rope is rigidly secured thereto in any well-known manner. The flange G serves a like purpose with relation to the spool D, which is likewise provided upon its opposite end with a smaller flange, $d$. Upon an extension of the spool D is formed a smaller flange or collar, $d′$, loosely fitted within a suitable housing, $a′$, which is a part of the casting or journal-box $a$. Said device serves to prevent a longitudinal movement upon the shaft A of the spools, screw, and clutch member F, the primary object thereof being to prevent an engagement of said clutch at all times except when desired.

To the spool D is attached one end of a cord, $d^2$, which cord, after passing through a sheave, $d^3$, upon a weight, $D^2$, Fig. 1, has its opposite end attached to the frame B. It is essential that said cord should be arranged to wind upon the spool D in a direction opposite to that of the rope $c$ upon the spool C.

Extending across the frame B, to which the same is rigidly attached by means of bolts $h\ h$, I place a cross-bar, H, to which are secured upwardly-curved bars H′ H′, the whole preferably forming one casting. Pivoted to the lower ends of said bars or supports H′ H′ at $h′$ is a yoke, J, the arms of which pass over the clutch member F′ and have studs $j′$, Fig. 1, which extend into an annular groove, $f′$, of the clutch member F′. A bar, $j′$, is rigidly attached to the yoke J, thus forming with said yoke an elbow-lever, to the extremity of which is adjustably secured, by means of a set-screw, $j^2$, a weight, J′, which, when allowed to fall, throws, by means of the yoke J, the clutch member F′ into engagement with its counterpart F. To prevent a continuous engagement thereof I extend a rigid arm, $J^2$, Fig. 1, upwardly from said yoke, which arm is adapted to engage when the weight J′ is raised within a notch or recess, $k$, Fig. 1, of a tripping-lever, K, which is pivoted at $h^2$ to the supports H′ H′, and which rests normally by its own gravity upon the end of the part $J^2$. The opposite end of said tripping-lever is bent downwardly, and has pivoted thereto at $k′$, Fig. 1, a latch, L, which is loosely supported, substantially as shown, by an extension, $k^2$, of the lever K, so that a downward pressure upon said latch will lift the opposite end of said lever K, while an upward pressure will raise said latch without affecting said lever.

Upon the outside of the flange or wheel G' and near its periphery I place studs or tappets $g$, which are partially rounded or oblong and placed obliquely to the respective radii of said wheel, as clearly shown in Fig. 4, said latch L being partially rounded or beveled upon its end and adjusted to engage with said tappets, the position and shape of which are such that when the wheel G' is revolved in one direction the latch is raised by and rides over the tappets, while the reverse movement of said wheel depresses said latch, thereby tripping the lever K and releasing the arm $J^2$ from its engagement with the notch $k$. As the latch L is in a position parallel to the axis of the flange or disk G', the shape and adjustment of the tappets become material in practice. It is important that the latch should have as large a bearing-surface as possible in order to prevent it from wearing too rapidly, while at the same time a revolution of the flange G' in one direction should cause the latch to pass over the lug, and an opposite movement should cause it to pass under. By giving the lugs a wide base and a twisting or concave taper toward the ends, the latch, in passing over or under, is caused to bear upon the entire length of the stud, instead of upon its end, thus greatly reducing the wear, while the lugs are much stronger than mere pins would be, and as they may be thus cast upon the flange G' the cost of construction is greatly lessened.

Upon the screw E I place a nut, M, which is provided with arms $m$ $m$, the ends of which rest upon the frame B, as more clearly shown in Figs. 2 and 3, which serves to support the weight of said nut as well as to prevent the latter from revolving with the screw E, which is thereby caused to move back and forth upon said screw whenever the latter is rotated. Upon the opposite sides of said nut M, I attach, by means of bolts $n$ $n$, pusher-arms N N, which are of such length as that their ends will strike against the lower end of the yoke J, when the nut shall have reached the outer end of the screw, as shown in the principal figures, and disengage the clutch member F from its fellow. The ends of the pusher-arms N N are provided with spiral springs $n'$ $n'$, which form cushions and thus prevent a too severe impact and a too rapid wear of the parts.

To prevent the rope $c$ from being thrown off the spool C from any cause, I prefer to place stationary guards O (better shown in Fig. 3) over the flanges G G', the same being attached to the frame by means of suitable bolts, as shown.

To avoid contact of the tappets $g$ with the arms $m$ $m$ of the nut M when the latter is screwed up closely to the wheel G', I place a stud, $g'$, upon said wheel to limit the backward movement of said nut, and thus prevent injury to said tappets.

The operation of said mechanism is as follows: The weight J' being sustained in an abnormal position by the tripping-lever K, and the clutch being released, as shown, the rope E is unwound from the spool C to the extent desired by the operator, while at the same time the nut M is moved toward said spool, the cord $d^2$ is wound in an opposite direction upon the spool D, the weight $D^2$ is raised thereby, the latch L in the meantime riding over the tappets $g$. As soon as the rope $c$ is slackened the weight upon the cord $d^2$ initiates a backward movement of the spools, and the latch L being depressed by one of the tappets $g$, the lever K is tripped, the weight J' released, and the clutch member F' brought into engagement with its fellow, when said spools are caused to revolve with the shaft A, the rope $c$ rewound, and the weight $D^2$ lowered, when the nut M, having again reached the outer end of the screw, the clutch is disengaged by the pushers and thrown back, and the weight J' raised sufficiently to permit the tripping-arm K to engage the arm $J^2$, upon which the rope $c$ may be again unwound and the operation repeated indefinitely, said action at all times being wholly automatic and capable of being operated by the most unskilled workman.

I am aware that a tripping-lever and tappet-wheel have been heretofore used in grain-shoveling mechanism for reversing the movement thereof, and I do not claim the same, broadly; nor do I claim any of the features described in my Patent No. 278,993, dated June 5, 1883; but What I do claim, and desire to secure by Letters Patent, is—

1. In a grain-shoveling mechanism, the flange or disk G, provided with oblong tapered lugs $g$, arranged obliquely to the respective radii of said disk, with the parts C, D, E, and F, cast in one piece, all substantially as and for the purposes specified.

2. In a grain-shoveling mechanism, the combination of the flange or disk G', provided with oblong tapered lugs $g$, arranged obliquely to the respective radii of said disk, and the tripping-latch L, arranged at right angles to said flange, whereby the movement of said wheel in one direction may cause said latch to pass above said tappets, while its reversal may cause the same to pass beneath them, substantially as and for the purposes described.

JOHN S. METCALF.

Witnesses:
MURTT BARNICKEL,
WM. J. KUPPER.